United States Patent [19]

Ueda et al.

[11] 4,432,613
[45] Feb. 21, 1984

[54] EXPOSURE LIGHT BEAMS CONTROL METHOD FOR USE IN A PICTURE REPRODUCING MACHINE

[75] Inventors: Sadao Ueda, Yasu; Isao Tokura, Uji; Mitsuhiko Yamada, Kyoto, all of Japan

[73] Assignee: Dainippon Screen Seizo Kabushiki Kaisha, Kyoto, Japan

[21] Appl. No.: 253,049

[22] Filed: Apr. 10, 1981

[30] Foreign Application Priority Data

Apr. 10, 1980 [JP] Japan ................. 55-47122

[51] Int. Cl.³ .............................................. G02F 1/11
[52] U.S. Cl. ...................... 350/358; 372/10; 372/13
[58] Field of Search ............. 350/358, 356, 354, 355; 372/13, 10, 3; 346/108

[56] References Cited

U.S. PATENT DOCUMENTS

| 3,800,303 | 3/1974 | Picquendar et al. | 350/358 |
| 3,964,825 | 6/1976 | Eschler | 350/358 |
| 4,084,182 | 4/1978 | Maiman | 350/358 |

*Primary Examiner*—William L. Sikes
*Assistant Examiner*—Léon Scott, Jr.
*Attorney, Agent, or Firm*—Marvin E. Jacobs

[57] ABSTRACT

A method for controlling exposure light beams for use in a picture reproducing machine such as a color scanner and a color facsimile, wherein a light beam is supplied to an acoustooptical deflector and is deflected thereby to obtain diffraction light beams which are incident to fixed light paths and are used for exposing a recording film, and wherein the diffraction light beams are controlled by varying a frequency of a supersonic wave supplied to the acoustooptical deflector so that each diffraction light beam may be or may not be incident to the respective light path.

6 Claims, 10 Drawing Figures

FIG. 5
| LIGHT OUTPUT MODE | B A O | B A O | B A O | B A O |
|---|---|---|---|---|
| E | $f_B \cdot V_B$ | $f_A \cdot V_A$ | $f_A \cdot \frac{1}{2}V_A$ | $V = 0$ |
| ON SWITCH | $S_1$ | $S_2$ | $S_3$ | $S_4$ |
| LIGHT PATH $L_1$ | CLOSE (0) | OPEN (1) | OPEN (1) | CLOSE (0) |
| LIGHT PATH $L_2$ | CLOSE (0) | CLOSE (0) | OPEN (1) | OPEN (1) |
| $F_1$ | L (0) | H (1) | H (1) | L (0) |
| $F_2$ | L (0) | L (0) | H (1) | H (1) |
FIG. 6
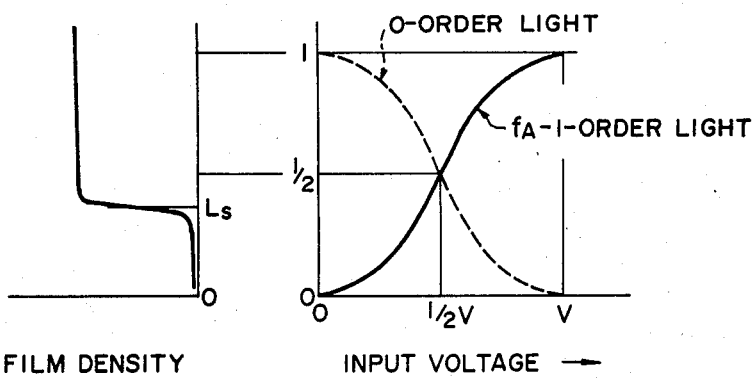
← FILM DENSITY          INPUT VOLTAGE →
FIG. 7
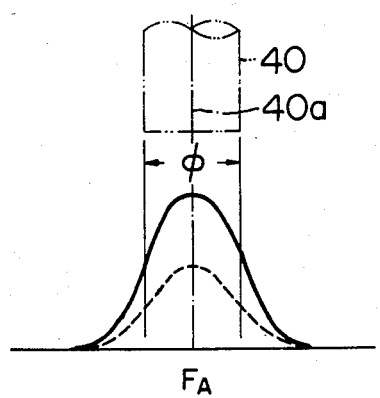
FIG. 8
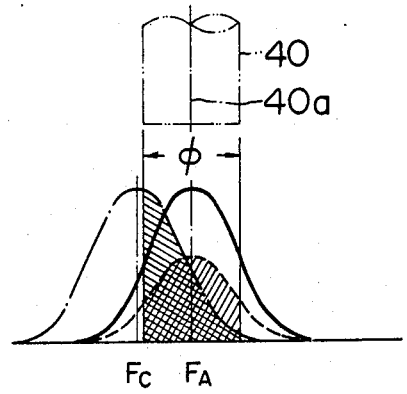

| LIGHT OUTPUT MODE | B CA O | B CA O | B CA O | B CA O |
|---|---|---|---|---|
| E | $f_B \cdot V_B$ | $f_C \cdot V_C$ | $f_A \cdot \frac{1}{2}V_A$ | $f_B \cdot \frac{1}{2}V_B$ |
| ON SWITCH | $S_1$ | $S_2$ | $S_3$ | $S_4$ |
| LIGHT PATH $L_1$ | CLOSE (0) | OPEN (1) | OPEN (1) | CLOSE (0) |
| LIGHT PATH $L_2$ | CLOSE (0) | CLOSE (0) | OPEN (1) | OPEN (1) |
| $F_1$ | L (0) | H (1) | H (1) | L (0) |
| $F_2$ | L (0) | L (0) | H (1) | H (1) |

EXPOSURE LIGHT BEAMS CONTROL METHOD FOR USE IN A PICTURE REPRODUCING MACHINE

BACKGROUND OF THE INVENTION

The present invention relates to a method for controlling exposure light beams for use in a picture reproducing machine such as a color scanner and a color facsimile.

A color scanner for plate making, which is capable of reproducing a halftone picture image directly without using a halftone screen, has heretofore been developed. In a picture recording unit of such a color scanner, in order to promote the processing speed without impairing the resolving power of the reproduction picture, usually, the scanning speed in the direction of a cylinder's periphery is increased, or optical recording scanning number is increased to several with respect to one mechanical scanning line and the scanning speed in the direction of a cylinder's axis is raised.

However, in the former method, the scanning speed in the direction of the cylinder's periphery of the color scanner having cylinders is restricted, and this scanning speed now practiced is near a mechanically critical speed. Hence, the scanning speed in the direction of the cylinder's axis is to be increased.

Then, in order to use a plurality of scanning lines in a single operation, an exposure means including control means which can generate and control a plurality of exposure light beams in parallel corresponding to such scanning lines, are required.

In the prior art, each conventional exposure light beam control means for performing such a method comprises an electronic shutter means composed of a combination of an electrooptical deflector element and a deflector filter, as disclosed in Japanese Patent Publication No. 52-33523.

In this case, however, a highly accurate adjustment of each light axis is required. Accordingly, the arrangement of a plurality of exposure light beam control means involves the complicated adjustments of the light axes of the exposure means, with the result of the lowering of the long-range stability. Thus, it requires a readjustment of them after a certain period of use, and the readjustment involves plenty of time and troubles.

Further, in such an exposure means, the exposure light beams are usually produced by dividing the light beam generated by a laser by using a plurality of half mirrors, and hence the luminous energy of the light beams divided are lowered.

Another method for obtaining a plurality of exposure light beams by impressing a plurality of supersonic waves of different frequencies to an acoustooptical deflector element has been developed, as disclosed in Japanese Patent Laying-Open Specification No. 51-90601. In this case, since the supersonic waves having the different frequencies are supplied to the acoustooptical deflector element, in order to remove the influence of the interferences of their frequencies monospectral supersonic waves should be used accordingly.

Furthermore, since the acoustooptical deflector element allows to receive a restricted power of a laser beam, when the number of the exposure light beams is increased, the luminous energy of each exposure light beam equally divided may be largely reduced, and the deflection angles of first-order diffraction light beams corresponding to the frequencies of the supersonic waves are close to one another. Accordingly, an arrangement and a position adjustment of optical systems for separating the light paths of the exposure light beams became complicated, and further stability of the frequencies of the supersonic waves should be raised.

SUMMARY OF THE INVENTION

It is an object of the present invention to provide a method for controlling exposure light beams for use in a picure reproducing machine such as a color scanner and a color facsimile free from the aforementioned defects, which removes interferences of frequencies of supersonic waves supplied to an acoustooptical deflector means, which is readily adjustable, and which is capable of performing a quick and stable reproduction.

According to the present invention there is provided a method for controlling exposure light beams for use in a picture reproducing machine, wherein a light beam is deflected by an acoustooptical deflector to obtain diffraction light beams which are incident to fixed light paths, and wherein the diffraction light beams are controlled by varying a frequency of a supersonic wave supplied to the acoustooptical deflector so that each diffraction light beam may be or may not be incident to the respective light path.

BRIEF DESCRIPTION OF DRAWINGS

In order that the present invention may be better understood, preferred embodiments thereof will be described with reference to the accompanying drawings, in which:

FIG. 5 is a graph showing relations among light output modes, output states of signals of essential parts, and open or close states of analog switches of FIG. 3;

FIG. 6 is a graph showing a relation among an input voltage supplied to an acoustooptical deflector, output characteristics of zero-order and first-order diffraction lights, and gamma characteristics of a recording film;

FIG. 7 shows a luminous energy distribution of the first-order diffraction light beam supplied to an optical fiber;

FIG. 8 is a similar chart to that in FIG. 7, showing a luminous energy distribution of the same light beam as that of FIG. 7, shown by a one-dotted line, when the frequency is changed from that of FIG. 7;

DESCRIPTION OF PREFERRED EMBODIMENTS

Figure 1:
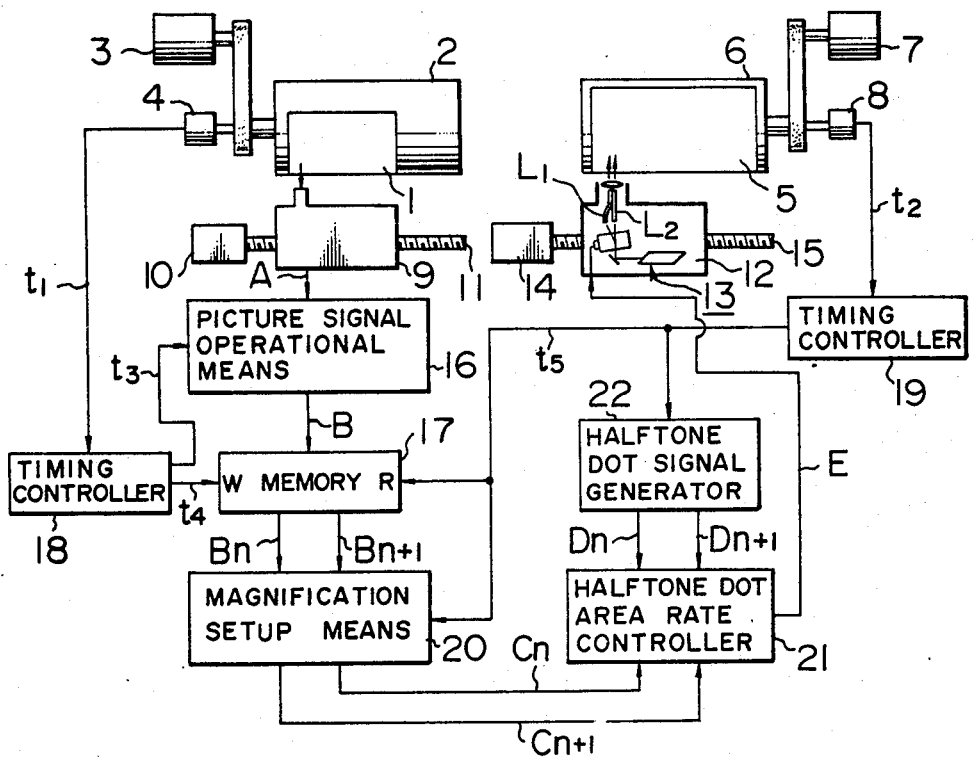
FIG. 1 is a schematic view of a picture reproducing machine for reproducing a halftone picture image directly from an original picture having a continuous gradation scale, including an exposure means to which a method according to the present invention is applied.

Referring to the drawings there is shown in FIG. 1 one embodiment of a picture reproducing machine for reproducing a halftone picture image directly from an original picture having a continuous gradation scale, including an exposure means to which a method according to the present invention is applied.

a picture cylinder 2 on which an original picture 1 is mounted, is rotated at a speed corresponding to that of a scanning in a direction of cylinder's periphery by a motor 3 through pulleys and an endless belt. The rotating speed of the picture cylinder 2 is detected by a rotary encoder 4.

A recording cylinder 6 having the same diameter as that of the picture cylinder 2, on which a recording film 5 is mounted, is rotated by a motor 7 through pulleys and an endless belt, and its rotating speed is detected by a rotary encoder 8.

The two rotary encoders 4 and 8 outputs timing pulses $t_1$ and $t_2$ at certain intervals corresponding to the rotating speeds of the two cylinders 2 and 6, i.e. the scanning speeds in the directions of cylinder' peripheries.

A pickup head 9 is movably mounted to a screw shaft 11 which is rotated by a motor 10 connected thereto, and thus the pickup head 9 is moved along the screw shaft 11 by the motor 10 in the direction of cylinder's axis so as to scan the original picture 1 mounted to the cylinder 2.

A recording head 12 including an exposure means 13 to which the present invention is applied, is movably mounted to a screw shaft 15 which is rotated by a motor 14 connected thereto, and hence the recording head 12 is moved along the screw shaft 15 by the motor 14 in the direction of cylinder's axis so as to scan the recording film 5 mounted onto the cylinder 6.

In this embodiment, the exposure means 13 generates two exposure light beams in parallel along light path $L_1$ and $L_2$ so that the two scanning lines may be scanned at the same time. Hence, the picture cylinder 2 is so controlled that the relative rotation speed of the picture cylinder 2 may be exactly twice as fast as that of the recording cylinder. When the exposure means 13 generates more than three exposure light beams in parallel, the rotation speed of the picture cylinder 2 is more than three times as fast as that of the recording cylinder 6.

However, the moving speeds of the pickup head 9 and the recording head 12 are determined depending on a reproduction scale, regardless of the rotation speed ratio between the two cylinders 2 and 6. When the reproduction scale is one, the two heads 9 and 12 are moved at the same speed, and when the reproduction scale is two, the recording head 12 is moved at the twice speed as fast as that of the pickup head 9.

In other words, when the exposure means generates two exposure light beams, the moving pitch of the recording head 12 per one rotation of the recording cylinder 6 is twice as fast as that of the pickup head 9 per one rotation of the picture cylinder 2.

The pickup head 9 picks up a picture signal by scanning the original picture 1 and then color-separates the picture signal to obtain color separation picture signals A of primay colors, which are fed to a picture signal operational means 16. The picture signal operational means 16 performs picture signal processings of the color separation picture signals A every separation color, such as masking, color correction, and other necessary processes, and outputs one of the obtained color separation signals of cyan, magenta, yellow and black ink colors.

Then, the signal output from the picture signal operational means 16 is properly converted into a digital picture signal B in the course of the process and then is sent to a memory 17. The memory 17 separates the digital picture signals B into two groups $B_n$ and $B_{n+1}$, wherein n means a scanning line number, corresponding to the two adjacent scanning lines.

The writing of the signal B into the memory 17 is carried out by a writing pulse $t_4$ which is synchronous with a timing pulse $t_3$ for the analog-digital conversion. The timing pulse $t_3$ is generated by a timing controller 18 according to a timing pulse $t_1$ generated by the rotary encoder 4.

The reading of the signals $B_n$ and $B_{n+1}$ out of the memory 17 is performed by a reading pulse $t_5$ generated by a timing controller 19 according to a timing pulse $t_2$. The signals $B_n$ and $B_{n+1}$ for two scanning lines of the original picture are read out at the same time from the same scanning start point.

The digital picture signals $B_n$ and $B_{n+1}$ are sent to a magnification setup means 20 in which in order to vary a reproduction scale of a picture image the signals are properly repeated or skipped in the direction of the time axis or the cylinder's periphery, as occasion demands, depending on the reproduction scale, and then the digital signals are converted into magnification-changed analog picture signals $C_n$ and $C_{n+1}$.

Thus the obtained picture signals $C_n$ and $C_{n+1}$ are sent to a halftone dot area rate controller 21. A halftone dot signal generator 22 outputs halftone dot signals $D_n$ and $D_{n+1}$ for producing halftone dot patterns periodically, corresponding to the scanning line numbers n and n+1 of the signals $C_n$ and $C_{n+1}$, to the halftone dot area rate controller 21. Then, in the halftone dot area rate controller 21, a light path control signal E of one channel is produced from the picture signals $C_n$ and $C_{n+1}$ and the halftone dot signals $D_n$ and $D_{n+1}$ depending on a condition of a combination of open and/or close states of the light paths $L_1$ and $L_2$, as hereinafter described in detail. The light path control signal E is not directly related to the picture signals $C_n$ and $C_{n+1}$. The halftone dot area rate controller 21 outputs the light path control signal E to the recording head 12, and the light path control E controls the exposure means 13 so as to open and/or close the light paths $L_1$ and $L_2$ of the exposure light beams.

Figure 2:
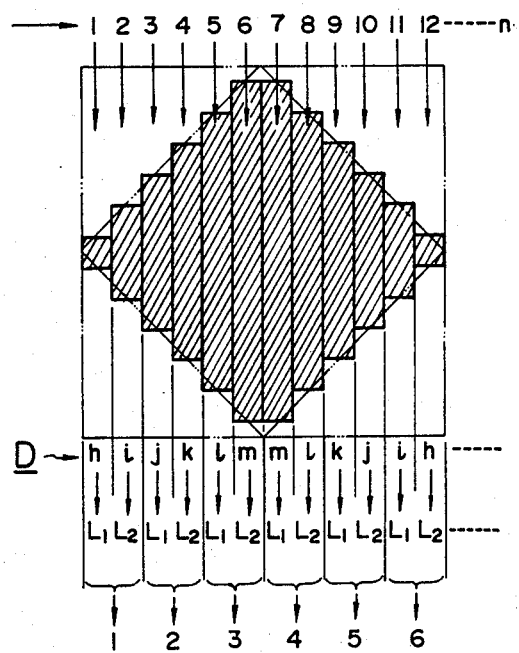
FIG. 2 shows a typical halftone dot shape which is reproduced by the machine of FIG. 1.
Figure 4:
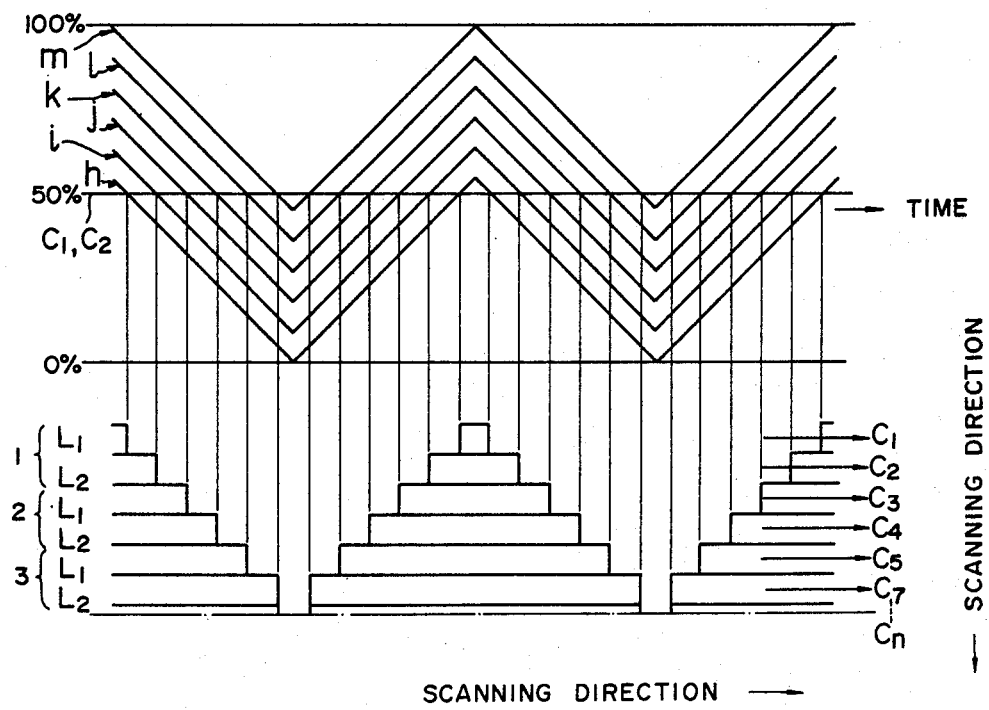
FIG 4 is a time chart showing wave forms of halftone dot signals and open or close states of light paths.

In FIG. 2 is shown a typical halftone dot shape produced on the recording film 5 by the exposure means 13 controlled by the light path control signal E, wherein a screen angle is zero degree and the halftone dot area rate is 50%, wherein D means the halftone dot signal and numbers shown upside and downside are scanning line numbers of the pickup head 9 and the recording head 12, respectively, and wherein h−m mean wave form signals for the halftone dot signals shown in FIG. 4.

Figure 3:
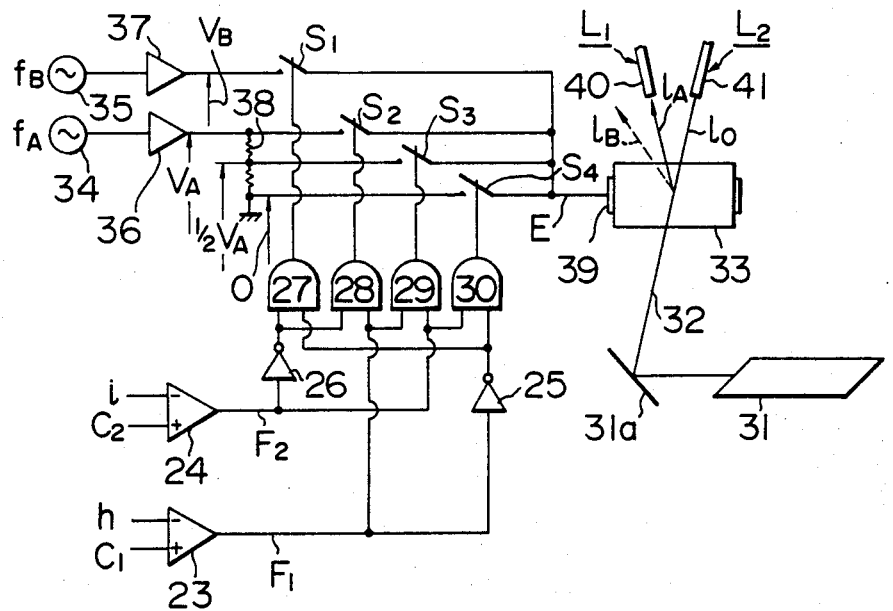
FIG. 3 is a circuit diagram of one embodiment of the exposure means of FIG. 1.

In FIG. 3 there is shown one embodiment of the exposure means 13 provided in the recording head 12, to which a method according to the present invention is applied. In FIG. 4 are shown open or close states of the light paths $L_1$ and $L_2$ and the wave form signals h−m of the halftone dot signals, which convert the picture signals $C_n$ and $C_{n+1}$ into light path open or close picture signals $F_1$ and $F_2$ in order to obtain halftone dot patterns corresponding to the halftone dot area rates depending on the scanning positions and the densities of the picture signals before obtaining the light path control signals E.

In FIG. 3 the light path open or close picture signals $F_1$ and $F_2$ are output by analog comparators 23 and 24 to which combinations of the picture signals $C_n$ and $C_{n+1}$ and the halftone dot signals $D_n$ and $D_{n+1}$ are input. In this case, the halftone dot signals $D_n$ and $D_{n+1}$ mean the triangular wave form signals h−m shown in FIG. 4, corresponding to the scanning line number n of the picture signals $C_n$ and $C_{n+1}$.

The triangular wave form signals h−m to be fed to the halftone dot area rate controller 21 as the halftone dot signals $D_n$ and $D_{n+1}$, are selected by the reading pulse $t_5$ depending on the scanning line numbers n and n+1 of the pair of picture signals $C_n$ and $C_{n+1}$.

For example, the triangular wave form signals h and i are selected for the scanning line numbers 1 and 2 of the pickup head 2, shown in FIG. 2. These signals h and i are fed to the comparators 23 and 24 together with the picture signals $C_1$ and $C_2$. The analog levels of the picture signals $C_1$ and $C_2$ correspond to the halftone dot area rates, as shown in FIG. 4. The comparators 23 and 24 produce the light path open or close picture signals $F_1$ and $F_2$ by slicing the triangular wave form signals h and i depending on the levels of the picture signals $C_1$ and $C_2$.

Each light path open or close picture signal $F_1$ or $F_2$ is a two-value signal having a high level H or "1" and a low level L or "0". According to the combination of these two values of the light path open or close picture signals $F_1$ and $F_2$, one of AND gates 27–30 is selectively made to be the light level by a digital logic circuit comprising inverters 25 and 26 and the AND gates 27–30. The output signal of the selected one of the AND gates 27–30 controls one of analog switches $S_1$–$S_4$ so as to close or open it.

Accordingly, the selective open or close operation of the analog switches $S_1$–$S_4$ involves the production of the light path control signal E which is fed to the exposure means 13 so as to open or close the light paths $L_1$ and $L_2$ in the two value modes corresponding to those of the light path open or close picture signals $F_1$ and $F_2$ output from the comparators 23 and 24.

The light paths $L_1$ and $L_2$ are positioned in the output side of an acoustooptical deflector 33 to which a laser beam 32 generated by a laser generator 31 is input via a mirror 31a. Into the light paths $L_1$ and $L_2$, diffraction light beams are incident along first-order and zero-order diffraction light paths $l_A$ and $l_0$ of the first frequency $f_A$ of the first supersonic wave generated by an oscillator 34.

Further, another diffraction light beam is deflected by the acoustooptical deflector 33 along another first-order diffraction light path $l_B$ of the second supersonic wave having the second frequency $f_B$, generated by an oscillator 35. The frequency $f_B$ is so selected that the diffraction light path $l_B$ may sufficiently be off the diffraction light path $l_A$. The signals having the first and the second frequencies $f_A$ and $f_B$ are amplified to the desired voltages $V_A$ and $V_B$ by power amplifiers 36 and 37, respectively.

When the analog switch $S_1$, $S_2$, $S_3$ or $S_4$ is closed, the voltage $V_B$ of the frequency $f_B$, the voltage $V_A$ of the frequency $f_A$, the voltage $V_A/2$ obtained by reducing the voltage $V_A$ by a voltage divider 38, or the zero voltage 0 is impressed respectively as the light path control signal E to an excitation electrode 39 of the acoustooptical deflector 33.

In FIG. 5 is shown a graph showing the relations among the light paths $L_1$ and $L_2$ which are opened when more than certain amount of light beams are incident, and which are closed when less than certain amount of light beams are incident or they are shielded; the analog switches $S_1$–$S_4$ which are "ON" when they are closed and are "OFF" when they are opened; the frequency components $f_A$ and $f_B$ and the voltage components $V_A$, $V_B$, $V_A/2$ and 0 of the light path control signal E when one of the switches $S_1$–$S_4$ is "ON"; the output value "H" and/or "L" of the light path open or close picture signals $F_1$ and $F_2$ generated by the comparators 23 and 24; and the light output modes. The hatching parts mean the luminous energy of the first-order and zero-order diffraction light beams B, A and 0 in the light paths $l_B$, $l_A$ and $l_0$.

As shown in FIG. 5, the open or the close states of the light paths $L_1$ and $L_2$ correspond to those of the light path open or close picture signals $F_1$ and $F_2$. In FIG. 5, when the analog switch $S_3$ is closed, the luminous energy of the light beams A and 0 is the half in the light output mode, and the light path $L_1$ and $L_2$ are indicated to "open". This reason is as follows.

That is, the characteristics lines of the first-order and the zero-order light beams of the frequency $f_A$ along the light paths $l_A$ and $l_0$ with respect to the input voltage are similar to sine square ($\sin^2$) curves, as shown in FIG. 6. Since the light paths $L_1$ and $L_2$ face the diffraction light paths $l_A$ and $l_0$, assuming that the voltage for saturating the first-order light beam is $V_A$, when the input voltage is approximately the half of the voltage $V_A$, the input light beams to the light paths $L_1$ and $L_2$ have the level of the half luminous energy.

Therefore, if the half luminous energy level of the light beam output from the deflector 33 is set to an exposure luminous energy level about a threshold level $L_S$ of the gamma characteristics of the recording film 5, the recording film 5 is exposed by the half luminous energy level of the output light beam in the similar manner to the one luminous energy level, and thus the light paths $L_1$ and $L_2$ can substantially be considered to be open.

In this embodiment, the recording film 5 should be exposed to the same extent by the half luminous energy level and the one luminous energy level according to the gamma characteristics of the film 5. However, since the luminous energy difference between the two levels is large, the one luminous energy level results a superexposure, and the lines and dots recorded may somewhat glows fat compared with the actual sizes.

In order to remove such an inconvenience, the luminous energy of the light beams during opening of the light paths $L_1$ and $L_2$ is made to be the same in all light output modes, or the luminous energy difference of the light beams is reduced. One example of the correction is described in the followings.

The light paths $L_1$ and $L_2$ made of optical fibers 40 and 41 may direct to the centers of the first-order and the zero-order light paths $l_A$ and $l_0$ of the diffraction light beams deflected by the acoustooptical deflector 33, respectively, in the same manner as shown in FIG. 3.

The luminous energy distribution of the first-order diffraction light beam along the first-order diffraction light path $l_A$ is shown in FIG. 7 wherein the deflection amount depending on the frequency $f_A$ of the supersonic wave and the strength of the light beam are plotted in the horizontal and the vertical axes, respectively, and wherein the diameter of the optical fibers is shown as $\phi$. The distributions of the one luminous energy and the half luminous energy are shown by solid and broken lines, respectively.

Hence, when the light axis 40a of the optical fiber 40 is adjusted to the maximum value position $F_A$ of the luminous energy distribution, the luminous energy of the light beam incident to the light path $L_1$ along the light path $l_A$ is the maximum. When the light axis 40a of the optical fiber 40 is shifted from the maximum value position $F_A$, the strength of the luminous energy of the light beam incident to the optical fiber 40 is reduced depending on the distance shifted from the position $F_A$.

In this case, since the light axis 40a of the optical fiber 40 is positioned relative to the maximum value position $F_A$ can be shifted by varying the frequency of the supersonic wave supplied to the acoustooptical deflector 33 in order to vary the luminous energy of the light beam incident to the optical fiber 40.

Hence, the luminous energy distribution shown in FIG. 7 can be shifted in the left hand side direction by supplying the third supersonic wave having the third frequency $f_C$ to the acoustooptical deflector 33, as shown by a one-dotted line in FIG. 8, wherein the maximum value position is shifted from the center $F_A$ of the optical fiber 40 to the left side position $F_C$ off the optical fiber 40.

In this embodiment, the third frequency $f_C$ is selected so that the luminous energy of the light beam incident to the optical fiber 40 according to the third frequency $f_C$, i.e. the area of the hatching part of the distribution wave of the one-dotted line may be the same as that according to the first frequency $f_A$, i.e. the area of the hatching part of the distribution wave of the solid line. Consequently, in the mode of the one luminous energy, of which the analog switch $S_2$ is closed, the luminous energy incident to the light path $L_1$ can be the same as that of the mode of the half luminous energy.

Further, in the mode of the one luminous energy, of which the analog switch $S_4$ is closed, the luminous energy of the light beam according to the second frequency $f_B$ can be the same as that of the mode of the half luminous energy by varying the voltage from the $V_B$ to $V_B/2$.

Figures 9, 10:
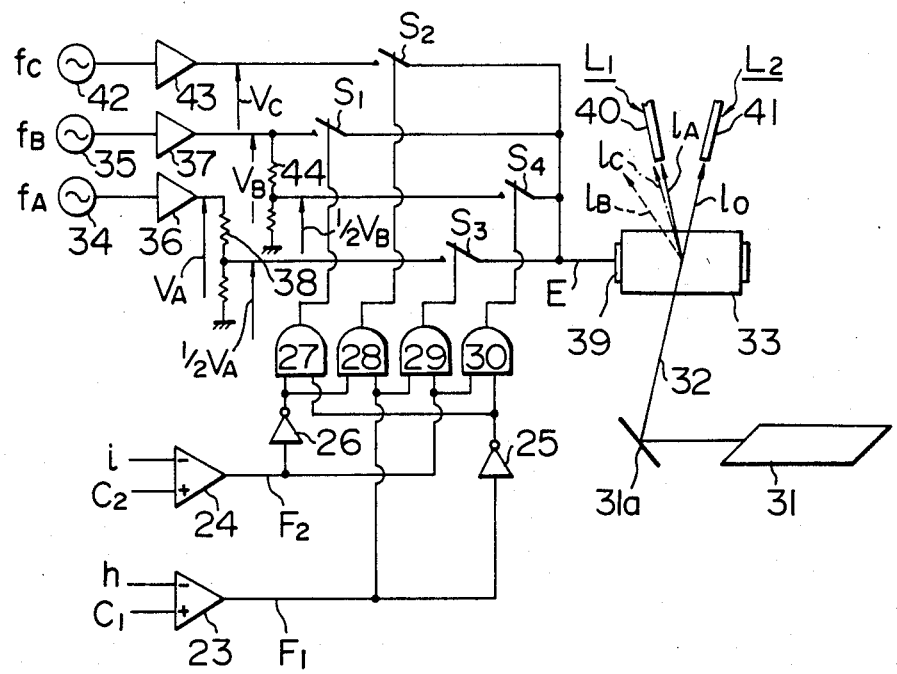
FIG. 9 is a circuit diagram of another embodiment of the exposure means similar to that of FIG. 3, wherein in this light output mode the output luminous energy is the half of that of FIG. 3.
FIG. 10 is a graph similar to that of FIG. 5 showing relations among light output modes, output states of signals of essential parts, and open or close states of analog switches of FIG. 9.

In FIG. 9 is shown another embodiment of the exposure means, similar to that of FIG. 3, in which the output luminous energy of the light paths are always in the mode of the half luminous energy, as described above. This exposure means has basically the same construction as that of FIG. 3, except that the third oscillator 42 for generating a supersonic wave having the third frequency $f_C$, a power amplifier 43 which is adapted to amplify the output voltage of the oscillator 42 to a saturation voltage and outputs a voltage $V_C$, and a voltage divider 44 connected to the output terminal of the power amplifier 37 are provided, as hereinafter described.

In this embodiment, when the level of the residual light of the zero-order light path $l_0$ is sufficiently lower than the threshold level $L_S$ of the recording film 5, as shown in FIG. 6, the light path $L_2$ is considered substantially to be closed and thus it is not always necessary to amplify the output voltage to the saturate voltage. In this case, of course, the luminous energy of the light beam incident to the light path $L_1$ along the diffraction light path $l_0$ can be adjusted by selecting the third frequency $f_C$ of the supersonic wave to a proper value.

Therefore, the necessary luminous energy of the light beam can be transferred to the light path $L_1$ in such a manner described above.

In FIG. 10 there is shown the light output modes obtained by opening or closing the analog switches $S_1$–$S_4$ shown in FIG. 9 in the same manner as those of FIG. 5. In this case, the area of the hatching part means the luminous energy in the light output mode.

In this embodiment, in order to obtain the light output modes of FIG. 10, the analog switch $S_1$, $S_2$, $S_3$ or $S_4$ is closed in order to feed the voltage $V_B$, $V_C$, $V_A$ or $V_B/2$ to the excitation electrode 39, in the former two cases directly or in the latter two cases through the voltage divider 38 or 44.

In this manner, as described above, the luminous energy of the light beams incident to the light paths $L_1$ and $L_2$ in all the light output modes can be uniformed to the half luminous energy level, or the difference between them can be largely reduced, thereby conducting the correction of the growing fat of the recorded lines and dots.

In the embodiment shown in FIGS. 3 and 9, the analog switches $S_1$–$S_4$ may be arranged before the power amplifiers 36, 37 and 43.

According to the present invention the luminous energy can be uniformed by utilizing higher-order diffraction lights. In this case, when the first-order diffraction light beam is in the light output mode of the one luminous energy, the basic frequency of the supersonic wave fed to the deflector 33 of the voltage wave impressed to the deflector 33 is varied so that the higher-order diffraction light beams are largely output so as to reduce substantially the first-order diffraction light beam, thereby performing the uniforming of the luminous energy. When the higher-order light beams are utilized, the analog switches $S_2$ and $S_3$ of FIG. 3 are arranged before the power amplifier 36 which possesses the desired saturation characteristics of the light transfer. Thus, in this embodiment, in the light output mode of the half luminous energy, of which the analog switch $S_3$ is closed, the signal is amplified without deforming of the output wave form. In the light output mode of the one luminous energy, of which the analog switch $S_2$ is closed, the signal is amplified with deforming of the output wave form according to the saturation characteristics of the amplifier, resulting in increasing the harmonic content of the wave form, and accordingly increasing the higher-order diffraction light beams components, thereby relatively decreasing the first-order diffraction light beam component.

When the exposure means of FIG. 3 or FIG. 9 is controlled by using a computer, or the like, signals having two values read out of a memory of the computer may be used instead of the light path open or close picture signals $F_1$ and $F_2$, as shown in FIG. 5 or FIG. 10.

Although the present invention has been described with reference to preferred embodiments thereof, however, various changes and modifications can be made by those skilled in the art without departing from the scope of the present invention.

What is claimed is:

1. A method for controlling exposure light beams for use in a picture reproducing machine, said method comprising the steps of:
   (a) applying a light beam to an acousto optical deflector deflecting said light beam to form diffracted light beams incident upon a pair of fixed light paths, (b) digitally controlling said diffraction light beams by applying a variable frequency supersonic wave to said acoustooptical deflector, so that each of said diffraction light beams, respectively, may be made selectively incident upon respective ones of said fixed light paths.

2. The method defined in claim 1 wherein an added step is included:

maintaining the uniformity of the luminous light energy levels of said respective light beams incident upon said respective light paths by selectively controlling the voltage level of said supersonic waves applied to said acoustooptical deflector.

3. The method defined in any of claims 1 or 2 wherein one of said diffraction light beams is a zero order diffraction light beam incident upon one of said light paths.

4. The method defined in any of claim 3, wherein one of said diffraction light beams is a first order diffraction light beam incident upon the other of said light paths.

5. The method defined in any of claims 1 or 2 wherein said diffraction light beams are of the same luminous intensity level and are incident upon both of said light paths.

6. The method defined in claim 1 wherein an additional step is included:

maintaining the luminous light energy levels of said respective light beams incident upon said light paths by controlling the intensity of the light beams incident upon said light paths, in response to digital signals.

* * * * *